(12) United States Patent
Waite et al.

(10) Patent No.: US 8,589,414 B2
(45) Date of Patent: Nov. 19, 2013

(54) COMPUTER IMPLEMENTED SYSTEM AND METHOD FOR PROVIDING A COMMUNITY AND COLLABORATION PLATFORM AROUND KNOWLEDGE TRANSFER, EXPERTISE, INNOVATION, TANGIBLE ASSETS, INTANGIBLE ASSETS AND INFORMATION ASSETS

(76) Inventors: Greg Waite, Ottawa (CA); Jason Clark, Ottawa (CA)

( * ) Notice: Subject to any disclaimer, the term of this patent is extended or adjusted under 35 U.S.C. 154(b) by 48 days.

(21) Appl. No.: 12/555,402

(22) Filed: Sep. 8, 2009

(65) Prior Publication Data
US 2010/0299334 A1 Nov. 25, 2010

Related U.S. Application Data

(60) Provisional application No. 61/095,265, filed on Sep. 8, 2008.

(51) Int. Cl.
*G06F 7/00* (2006.01)
(52) U.S. Cl.
USPC ............................ 707/749; 707/755; 707/899
(58) Field of Classification Search
None
See application file for complete search history.

(56) References Cited

U.S. PATENT DOCUMENTS

| | | | |
|---|---|---|---|
| 6,941,344 B2 | 9/2005 | Prell et al. | |
| 7,539,936 B2* | 5/2009 | Bender et al. | 715/235 |
| 7,890,549 B2* | 2/2011 | Elad et al. | 707/803 |
| 2002/0059188 A1 | 5/2002 | Nomura et al. | |
| 2004/0205537 A1 | 10/2004 | Graham et al. | |
| 2005/0027802 A1 | 2/2005 | Madsen et al. | |
| 2005/0097440 A1 | 5/2005 | Lusk et al. | |
| 2006/0031497 A1 | 2/2006 | Beartusk et al. | |
| 2006/0101058 A1* | 5/2006 | Chidlovskii | 707/102 |
| 2006/0168125 A1 | 7/2006 | Leo Spork | |
| 2007/0073625 A1 | 3/2007 | Shelton | |
| 2007/0260681 A1* | 11/2007 | Jacovi et al. | 709/204 |
| 2008/0114668 A1 | 5/2008 | Peters et al. | |
| 2008/0215474 A1 | 9/2008 | Graham | |
| 2008/0222279 A1 | 9/2008 | Cioffi et al. | |
| 2008/0270361 A1* | 10/2008 | Meyer et al. | 707/3 |
| 2008/0294683 A1 | 11/2008 | Graham et al. | |
| 2009/0019367 A1 | 1/2009 | Cavagnari et al. | |

(Continued)

FOREIGN PATENT DOCUMENTS

| | | |
|---|---|---|
| EP | 1970847 A1 | 9/2008 |
| JP | 2002207844 A | 7/2002 |
| WO | 03/098374 A2 | 11/2003 |
| WO | 2008/042711 A2 | 4/2008 |

*Primary Examiner* — Fred Ehichioya
*Assistant Examiner* — Anh Tai Tran
(74) *Attorney, Agent, or Firm* — Brian B. Shaw, Esq.; Harter Secrest & Emery LLP

(57) ABSTRACT

A computer implemented system and method for providing a computer and collaboration platform around knowledge transfer, expertise, innovation, tangible, intangible and information assets are disclosed. The system converts a static expert content into an active forum in an effective manner to promote collaboration among users in the various categories. The system converts the static content into one or more sections according to a parsing rule. Each section is assigned with one or more categories and one or more plug-ins for forming a framework. The system captures the framework as a model and generates one or more data partnering objects, and stores them in a database. Pursuant to a user's request and attributes of the user, appropriate one or more of the data partnering objects are retrieved from the database to generate an active forum. The system, then, publishes the active forum.

13 Claims, 8 Drawing Sheets

(56) References Cited

U.S. PATENT DOCUMENTS

2009/0112678 A1 4/2009 Luzardo
2009/0144808 A1 6/2009 Dhananjaya
2009/0204633 A1* 8/2009 Bender et al. ................ 707/102
2010/0299326 A1* 11/2010 Germaise ..................... 707/728

* cited by examiner

COMPUTER IMPLEMENTED SYSTEM AND METHOD FOR PROVIDING A COMMUNITY AND COLLABORATION PLATFORM AROUND KNOWLEDGE TRANSFER, EXPERTISE, INNOVATION, TANGIBLE ASSETS, INTANGIBLE ASSETS AND INFORMATION ASSETS

CROSS-REFERENCE TO RELATED APPLICATIONS

This application claims priority from U.S. Provisional Patent Application No. 61/095,265, filed on Sep. 8, 2008, the teachings of which are incorporated herein by reference.

STATEMENT REGARDING FEDERALLY SPONSORED RESEARCH OR DEVELOPMENT

Not Applicable.

NAMES OF THE PARTIES TO A JOINT RESEARCH AGREEMENT

Not Applicable.

REFERENCE TO A "SEQUENCE LISTING"

Not Applicable.

BACKGROUND OF THE INVENTION

1. Field of the Invention

The present invention relates to the fields of Internet based computer implemented methods and computer implemented systems for community collaboration. For the purposes of this patent application, a community collaboration software includes any form of collaboration software including without limitation bulletin board, forum software, wikis, blogs, chat, white boards, e-learning software, desktop sharing, file sharing, social media software and social networking software.

It further relates to the creation of an on-line market for the purposes of authoring and distributing expertise.

2. Description of Related Art

It is known in the art to provide collaboration software for groups of individuals to create and share information, interact with each other through the software and generally use the software to achieve an individual or group objective. Generally these systems store the collaboration for future reference and further discussion or collaboration.

These existing systems have a number of limitations:

(a) Substantial barriers to entry—there is no efficient automated technique for extracting pre-existing information sources, either legacy, proprietary, database, xml or within the framework itself and perpetuating that access to serve as the basis for community discussion and collaboration;

(b) There is no actionable capability for the most part other than, post, reply, ratings, subscriptions and digest. Consequently they are boundless systems that don't serve the discreet management functions of decisions, actions, budgets, score-carding and assessment;

(c) There is no technique or process for providing expert based communities with the ability to provide alternative interfaces and controls for authors, assessors and beneficiaries of expertise and serve all audiences in one framework;

(d) There is no capability to provide syndication of expert content conveyed in an assessment model to subscribing forums with controls for opt-in, content inclusion and exclusion;

(e) There is no capability to start discussion with a discussion thread creation capability through email with multiple participants and the ability to redirect that to a central discussion forum or wiki;

(f) There is no capability to provide an infinite organizational capability to discussion and collaboration while still providing an infinite number of plug-in capabilities with propagation of plug-in functionality from any of level of category of discussion to all child categories and topics; and (g) There is no capability to define and determine the mood around areas of discussion other than to print or view traditional metrics and statistics.

Accordingly, there have been long felt needs for some solutions that address at least one or more of the aforementioned limitations.

BRIEF SUMMARY OF THE INVENTION

An object of the present invention is to provide an extendable community and collaboration platform whereby participants can be involved in the creation, discussion, assessment and management of expert content, innovative ideas and topical information. The basis for this communication and collaboration is openly integrated with existing data sources and therefore requires very little effort to establish the discussion and collaboration base. A discussion, assessment or collaboration can be founded on a variety of data sources from SQL queries, XML and XML based documents and syndication. A multi-tiered organization structure coupled with data partnering between Categories and topics allows communities to exploit preexisting templates, standards, baselines, structures. Plug-ins for scorecarding, team scoring, survey, assessment, tasks delegation, budgets and decisions augment the traditional benefits of discussion and collaboration. The model provides a very robust authoring and distribution capability, effectively turning knowledge and expertise into decisions and action.

According to one embodiment of the present invention, it provides an efficient method and system for experts to package their expertise and for organizations and users to acquire and consume expertise in the context of their business or industry and optionally in the context of their data partnered elements.

Another object of the present invention is to remove many of the barriers and weaknesses of existing community and collaboration computer implemented methods and systems. In the context of barriers, people frequently begin discussions in email rather than in community discussion software. According to another embodiment of the present invention, it provides a computer-implemented method and system to re-create the discussion in the community collaboration software.

Additionally, another object of the present invention is to provide a computer-implemented method and system to capture the essence of whether discussion threads and community interaction is negative or positive. According to yet another embodiment of the present invention, it provides a computer-implemented method and system for abstracting moods based on user definable metaphors.

DETAILED DESCRIPTION OF THE INVENTION

According to one embodiment of the present invention, it provides a computer-implemented method and system for discussion and content dimensioning, the ability to size, organize, scale and populate discussion categories and topics in a number of ways:

(a) First, the topic and topic discussion threads, wiki and blogs can be nested in a 1 to N structure restricted only by the interface, computing power and storage; and (b) Second, each category is open to data partnering which allows the user to extract content one time or provide on-going synchronization with external data sources through XML, SQL Queries, CSV and existing Categories and Topics.

The present invention also provides a computer implemented server system and method for discussion and content propagation from email, whereby a user is able to forward an email to an address that is mapped to a category designated as an email posting category. An unlimited number of categories can be setup to receive email from unique email addresses.

A user (expert user and/or end user) that belongs to a community will also be able to invoke within a conventional e-mail client software, such as Outlook, an add-in to Outlook, which will provide an interface to start a discussion category or topic based on the email's subject and content as well as an interface to select and invite other users through email to participate in ongoing discussions within the community platform rather than continuing through email.

The present invention further provides a computer implemented server system and method to augment the basis for discussion(s) and content(s) and allow the server system to be used for very different horizontal and vertical applications. A set of personality plug-ins allows the computer implemented server system and method to be used as a platform for the purpose of authoring and distributing expertise. Team authoring with full discussion capability is provided. Groups with authoring rights can develop expert content which then can be exported and syndicated to other individuals, groups or communities that want to use that expert content to form their own discussions.

Figure 6:
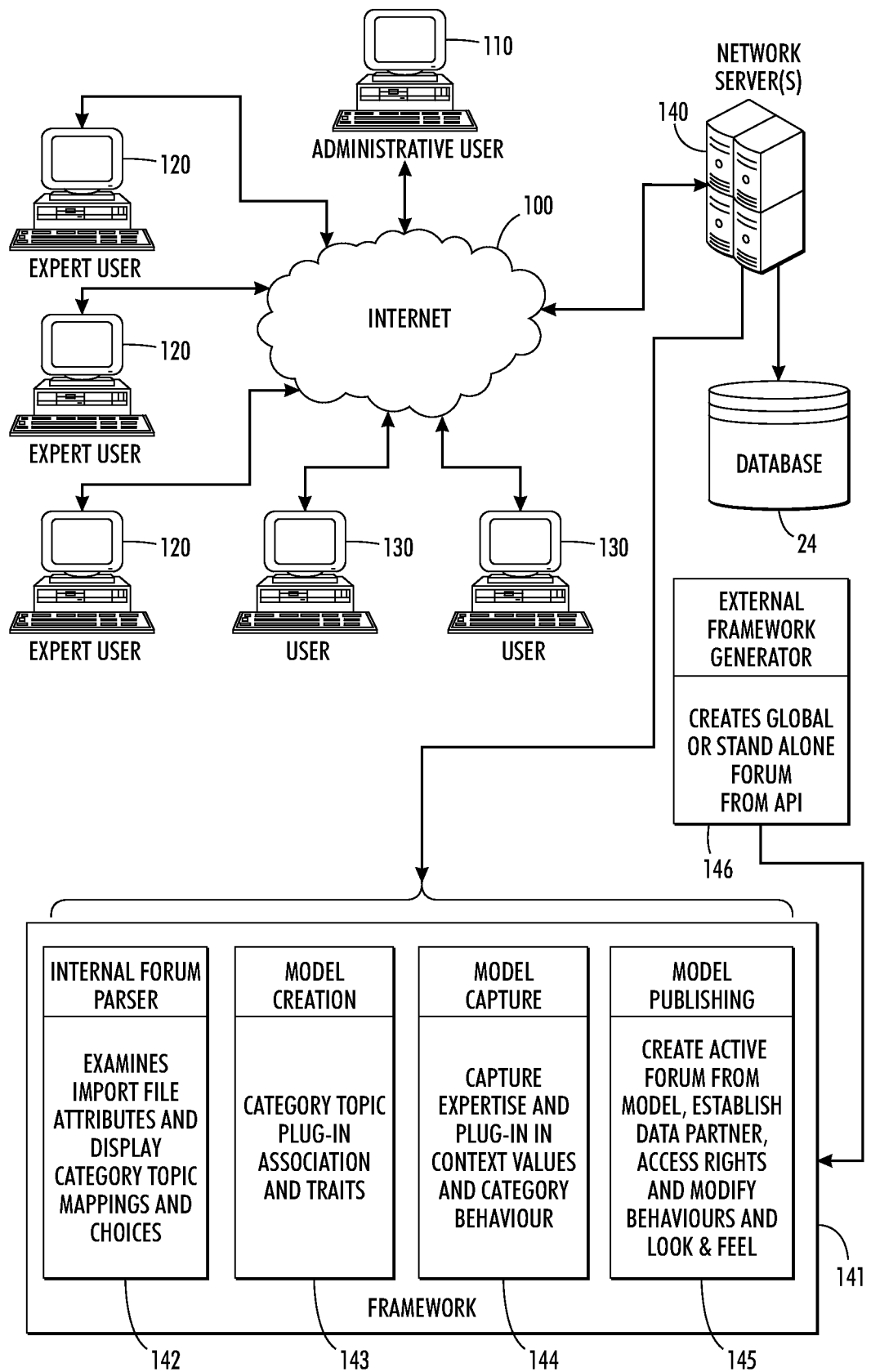
FIG. 6 shows a system overview of the embodiment of the present invention.

FIG. 6 shows a system overview of an embodiment of the present invention. One or more network servers 140 having an access to a data storage device(s) such as a hard disk or memory, comprising one or more databases 24. The network servers 140 are in communication with network communication means, such as Internet 100. One or more expert users 120, one or more administrative users 110 and one or more end users 130 access through the Internet 100 to the network servers 140.

Figure 1:
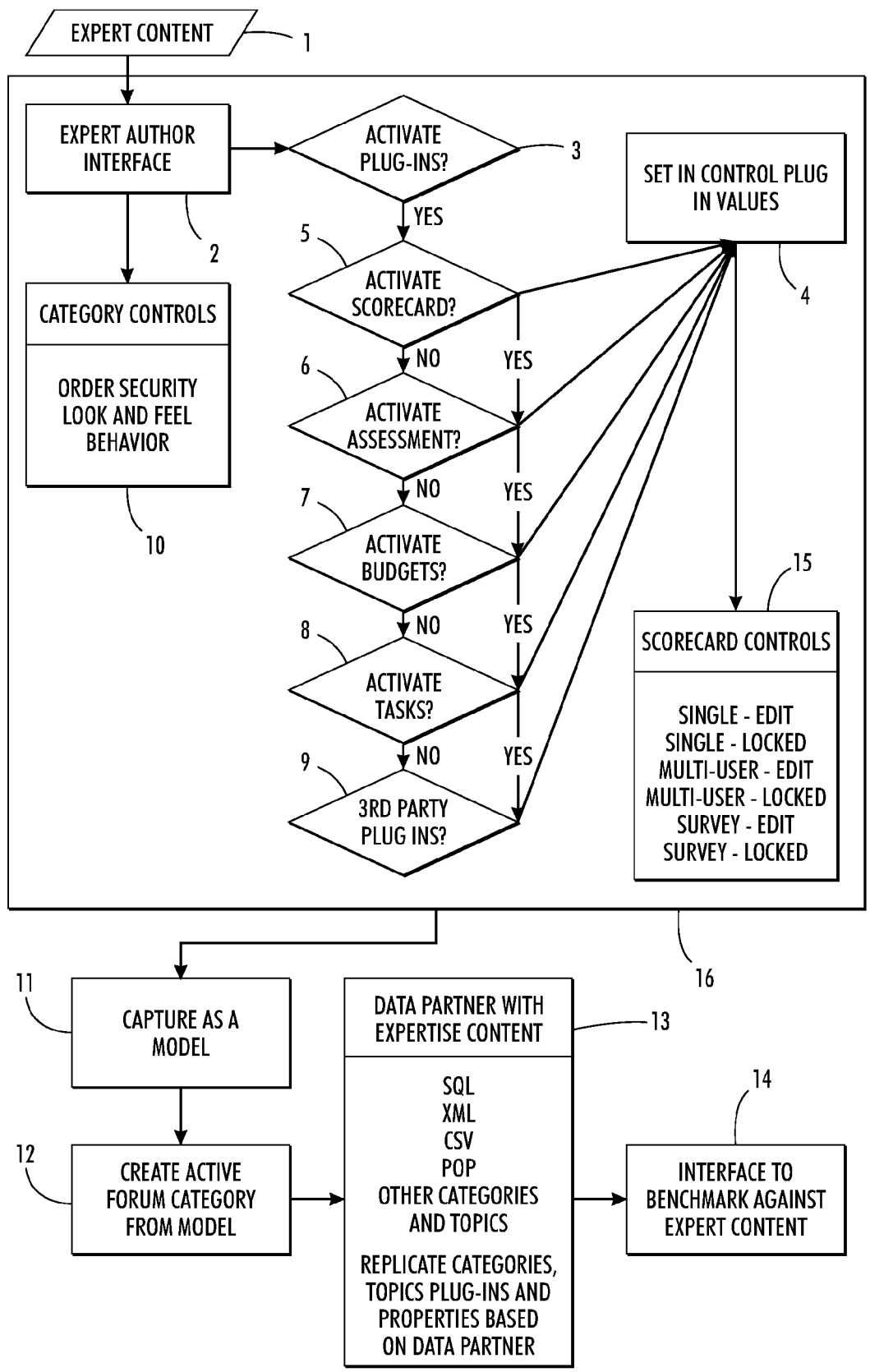
FIG. 1 shows a flow diagram of a process of transforming a state of conventional expert content into a dynamic state of an active forum of an embodiment of the present invention.

The network servers 140 are computer implemented server systems, implementing a framework 141, a process of which is shown as reference numeral 16 in FIG. 1, including but not limited to an internal forum parser 142, model creation module 143, model capture module 144, and model publishing module 145.

In FIG. 1, expert content 1 is authored and entered through Expert Author Interface 2 by an author (not shown) to form an expert framework 16. The Expert Author Interface 2, then, initiates and activates the internal forum parser 142. The internal forum parser 142 examines the expert content 1, splits the expert content 1 into sections according to a parsing rule(s) and associated or related context(s), and assigns attributes, categories, topic mappings, etc to each of the sections of the expert content 1 manually based on inputs by the author via the Expert Author Interface 2 or automatically by the internal forum parser 142. The Expert Author Interface 2 further allows the author to enable variety of actionable plug-ins 3 and corresponding associated host applications thereto for each of the sections of the expert content 1 separately and independently. The actionable plug-ins 3 include, but not limited to, scorecard 5, assessment 6, budgets 7, tasks 8, and $3^{rd}$ party plug-ins 9. The core plug-ins are scorecard 5 (individual, team and survey), assessment 6, budgets 7 and tasks 8.

The author can also set certain values for in context plug-in values 4, which optimize the utility of the expert framework 16. Without context, the expert content would be poorly defined in terms of optimizing the utility of having expert content 1 convert to a higher value proposition of assessment, benching marking and improvement. Context plug-in values go beyond descriptors and capture status or process in the context of systematic improvement of the expert content 1. The scorecard 5 is controlled via scorecard controls 15, and can be managed by a single user, multi-users or survey (unspecified multiple users). The scorecard 5 can be either editable by users other than the author of the expert content 1 or locked to a particular group(s) of users for preventing others from editing and, therefore, to force to maintain the integrity and authenticity of the original authored expert content 1. Once this process is complete, such framework is captured as a model at step 11, and the model is stored in the database 24.

These plug-ins 3, 5, 6, 7, 8 and 9 compliment expert authored content (or expert content) 1 and allow communities to go beyond discussion and allow them to benchmark or assess against the expert standard, provide assessment comments, set priorities, action plans and budgets. The network servers 140 furthermore provide an end user(s) or expert user(s) to augment the expert content 1 while still respecting a syndicated relationship with the expert content 1 so that the end user(s) or expert user(s) can streamline, advance and provide a turnkey expert assessment framework based on their unique needs.

Additionally, a user (expert user or/and end user) that assessing an expert(s) can then propagate documentation(s), suggestion(s), guideline(s), warning(s) coming out of a particular assessment process that would be beneficial for the general membership (for example, commonly employees). It is essentially a life cycle knowledge based framework involving authoring, assessment, improvement and dissemination. The present invention provides a computer implemented server system and method that allows authors to use web based authoring tools in order to offer syndicated content(s) to less capable user organizations, which in turn will be benchmark, improve and publish broader direction to a user community(ies). The platform basically matches experts to managers who then serve community(ies).

The plug-ins 3 other than the core plug-ins include, but are not limited to: audit, analysis, assets, ads, agreements, bugs, chat, content, contracts, controls, decisions, copyright, discovery, forms, chart, innovation, invention, copyright, patents, knowhow, trademarks, trade secrets, domains, innovation, meetings, IP, map, newsgroups, operations, outlines, policy, process, procurement, projects, reports, sponsorship, strategy, tactics, teams, trends, analytics.

Figure 9:
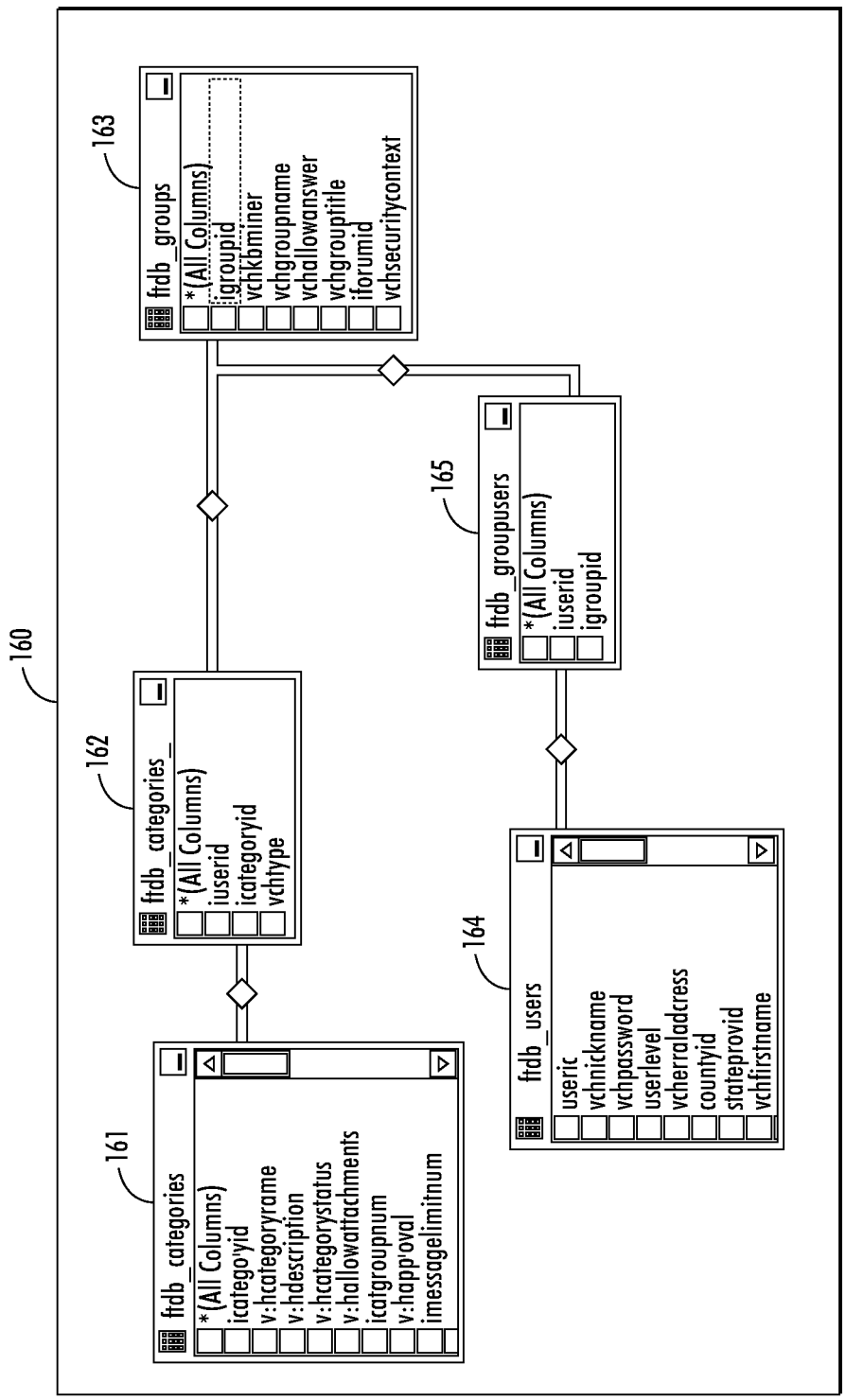
FIG. 9 shows an exemplary schema, defining a relationship between categories, groups and users who participate in the model and the active forum in various capacities as administrators, experts and users.

The author can then control order, security (or access privilege), look and feel, and program behavior 10 to create a model for the expert content 1 for framework 16. This process extends to any one or more categories for one or more frameworks or models. The various roles of users are handled through this process and a data dictionary depicted in FIG. 9. FIG. 9 shows an exemplary schema 160 that supports N level Categories 161, N Level Groups 163, N Level users 164, Group and User Category relationships 162 and User Group relationships 165.

Since the network servers 140 support data partnering with categories and different plug-ins and security accesses for partnered categories, the network servers 140 provides an active forum for different audiences and for completely different purposes.

The network servers 140 allow a user and/or expert user to initiate and activate the model capture module 144 for capturing the model created based on the expert content 1, storing the model in the database 24, generates data partnering objects according to the model and store same to the database 24, and published an active forum that is generated by retrieving appropriate one or more data partnering objects and models from the database 24 in response to a request from a user and/or attributes of the user, such as categories that the user is interested in, topics, etc, by the model publishing module 145. The network servers 140 allow the expert framework 16 to be applied to create an active forum 12 or/and in a plurality against virtually any relevant data partner object 13. This is vastly superior to other change state documents such as PDF's that offer a sequential reading with just bookmarking and search. The expert content 1 is replicated with framework controls across data partner objects 13 at far greater efficiency than others, such as spreadsheet or PDF documents.

The network servers 140 do not provide means to propagate discussion and content only via web client software (for example, a web browser) but also via email, whereby a user is able to forward an email to an address that is mapped to a category designated as an email posting category. An unlimited number of categories can be setup to receive email from unique email addresses.

A new active forum(s) or a new category(ies) of expert content 1 are created dynamically from the model 12 and are data partnered with a variety of data sources representing data partnering objects 13 against which you can benchmark, manage or assess the expert content against. These can be buildings, people, hazards, employees, processes, patents or any number of data partnering objects 13.

The expert content 1, framework 16 and associated data partnering objects 13 are then made available through an interface 14 and via the model publishing module 145 to users (expert users and/or end users) who can perform an evaluation or assessment.

Figure 5:
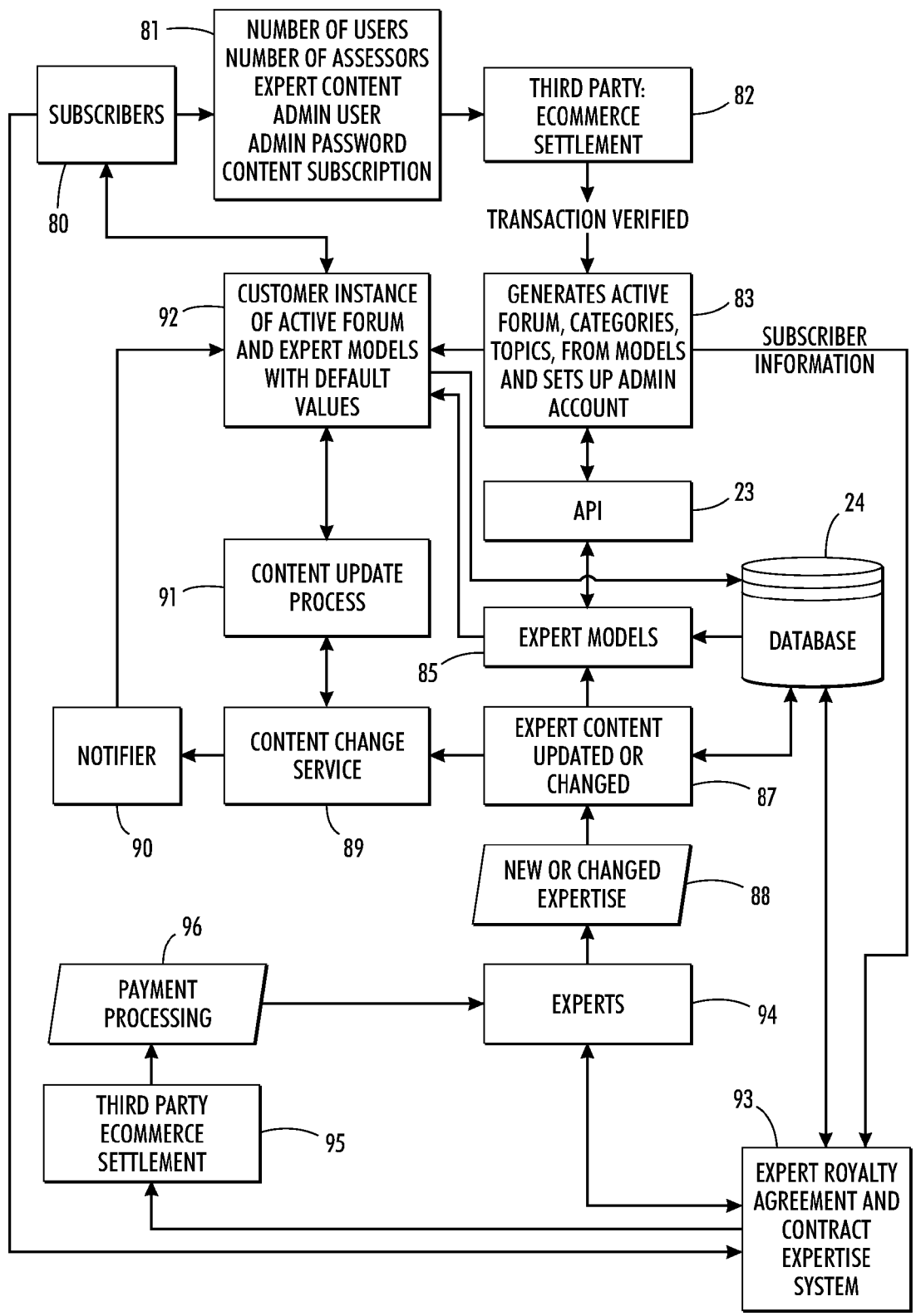
FIG. 5 shows a flow diagram of a subscription process to and dynamically creating an active forum from a model.

Referring to FIG. 5, the network servers 140 also allow for the expert user(s) and/or end user(s) who contribute subject matter expertise to a library to be rewarded for their contribution through an ongoing royalty distribution 93. It also provides means for subscribers 80 to gain individual access to the expert 94 to contract through the network servers 140 for changes to the content or to provide one on one service 93.

The network servers 140 further implement a subscription system 81 that allows subscribers 80 through an online facility to select the content/expert library that they would like to license, along with administrative credentials, the number of assessors assessing the expert content 1, and the number of end users that would want access thereto.

The assessors and/or end users would also indicate whether they would want to subscribe to content improvements including the term of subscription. The network servers 140 then activate or call e-commerce settlement module (for example, a third party ecommerce settlement application) 82 to process the billing and payment method for the subscribers 80. Once the transaction is verified, the network servers 140 generates an active forum according to the subscriber's categories and topics based on expert models through an API 23 which accesses the expert models 85 that reside in the database 24 and generates an active forum or a unique instance of an expert content based community 92 with pre-set expert contents, administration, groups and access rights.

A verified transaction by the e-commerce settlement module 82 with the creation of a subscriber forum (or active forum) triggers an expert royalty agreement and contract system 93 which is accessible by Experts 94. to provide instructions to an e-commerce settlement system (or third party payment processing system) 95 and outputs payment processing process 96 to the Experts 94 according to the usage of the corresponding expert content.

The expert(s) 94 may provide new or changed expertise 88 which updates the expert content(s) 87. An expert content change service 89 is invoked based on any change to the expert content 87, and the expert content change service 89, in turn, invokes a notifier 90 which alerts the associated forum administrator(s) through the active forums 92 related to the expert content 87 and further invokes the content update process 91 as an interface which retrieves the updated expert content(s) from the expert model 85, present changes to a subscriber(s) for receiving approval(s), and applies the changes subject to the subscriber approval(s).

Beyond expertise, which essentially addresses the management of anything, the network servers 140 are also applicable to innovation and intellectual property. The network servers 140 can data partner, for example, using known data partnering protocols, with intellectual property and legal agreement databases (not shown) and provide scorecarding for patent valuation, invention classification, license risks and opportunities, and agreement exposure.

The network servers 140 are provided with an existing innovation database schema that can supplement existing intellectual asset management systems, accounting systems, human resource systems or can be run independently. The network servers 140 allow, via an active forum, employees, managers, contractors, owners, consultants, advisors and shareholders to contribute, build-on, debate and assess ideas and opportunities.

The network servers 140 consists of a participation, contribution and awards systems that allow administrators to establish how they want to incent the various participants (expert users and/or end users), including financial, recognition and in-kind contributions to charitable organization of the either the individual or organizations choice.

The online signup for expert users based content/libraries provides a calculator for displaying the amount of time the users saved by licensing, the expert based library based on the assessors skill level and that of the average member.

Figure 2:
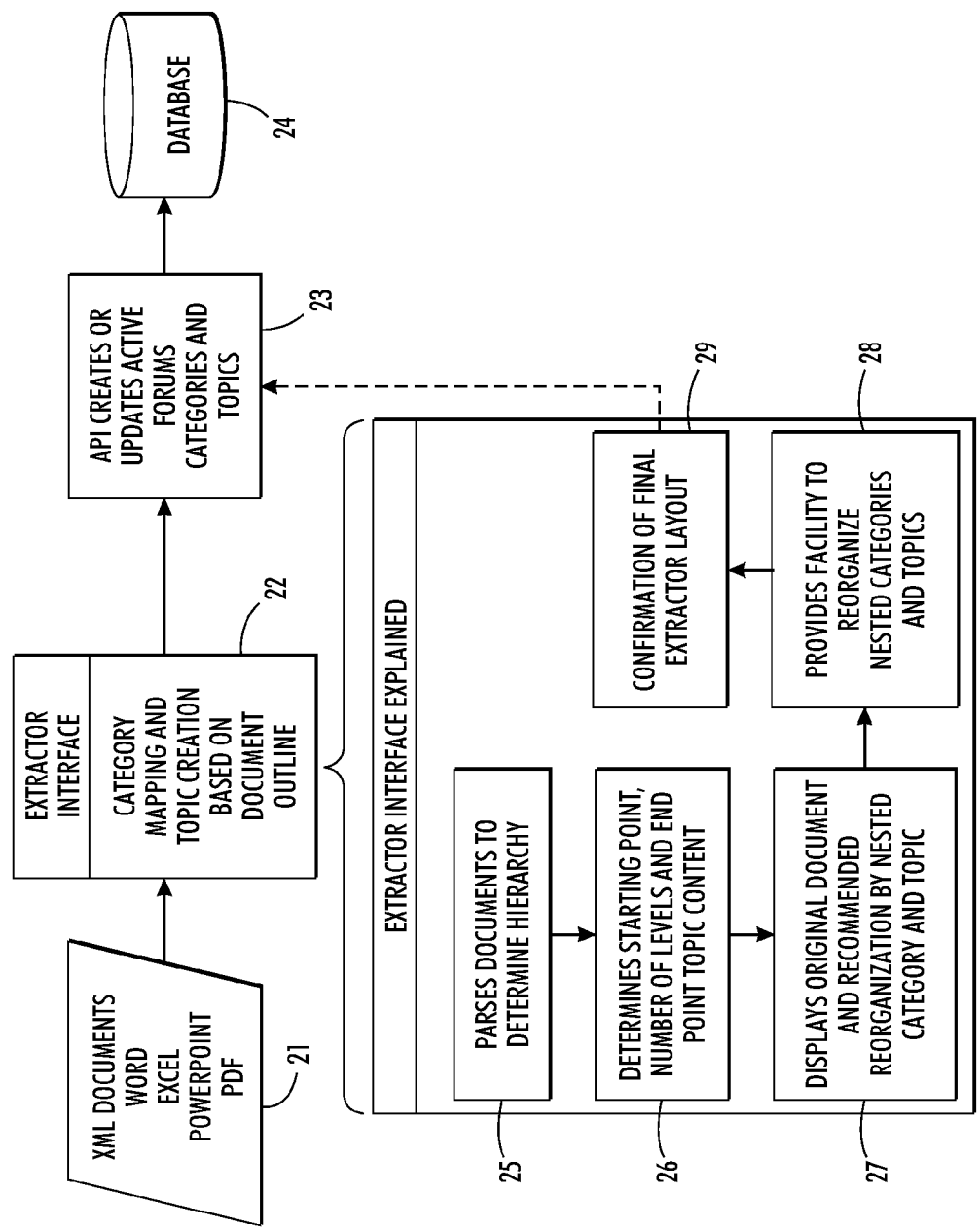
FIG. 2 shows a flow diagram of a process of extracting category mapping and topic from an input document into an active forum.

Referring back to FIG. 2, the network servers 140 of the embodiment of the present invention allows an expert user 120 to enter expert content 1 using xml documents, Microsoft Word, Microsoft Excel, Microsoft PowerPoint and/or Adobe PDF files 21 as input (or imported document) to an extractor interface 22. The extractor interface 22 parses the imported document according to a parsing rule(s), and presents a mapping of categories and topics against the outline of the imported document. The extractor interface 22 includes the expert author interface 2, which invokes the model creation module 143, model capture module 144 and model publishing module 145 in the similar manner as the aforementioned. The lowest data element in the imported document, for example, is presented by default as a topic while upper elements in the outline are presented hierarchically as categories. Outline elements can be combined to form a category or topic.

When the design of the content is completed, the extractor interface 22 invokes the API 23 to create or update category and topic content for one or more active forums, blogs and wikis in the database 24.

The extractor interface 22 initially parses the documents to determine a hierarchy 25 and the scope of the content in terms of the starting point or highest point of the imported document 26, for example, the title or the header, the number of levels (for example, sections, chapters, outline levels and topic endpoint such as a sentence or paragraph). The extractor interface 22 displays to the expert user (or author) a view of the original imported content in a separate pane and then provides a machine generated layout of the imported document in nested categories and topics 27 in a separate pane and allows the author to reorganize the nested categories and topics 28. Once a desired layout is achieve, confirmation of final extractor 29 occurs and then the extractor calls the API 23 to create or update Forum, Blog or Wiki, Categories and Topics in the database 24.

The embodiment of the present invention provides a computer-implemented system and method that takes a static content, parsing and splitting the imported content into sections so that the imported content can be made available within an active forum, blog or wiki for discussion and collaboration. The extractor interface 22 further invokes the framework 16, allowing users/expert users to bring the full framework 16 to bear on the expert content (or imported document).

For example, the importation of a large Word document which covers 100s of areas of improvements for Government. By importing the 100s of areas of improvements, the present invention allows users to hold discussions and score, assess, budget and assign tasks to very specific section areas of improvement. $3^{rd}$ party plug-ins can further augment the capability of making information actionable. Category and topic data partnering as well as database data partnering provides means of propagating specific sections to specific forums.

Figure 7:
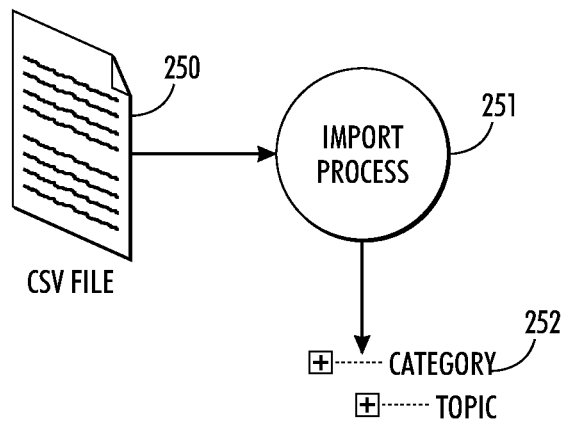
FIG. 7 shows a flow diagram of a process of creating categories and topics in an active forum from one of several types of import documents.

In FIG. 7, we see an example of a CSV file 250 by which the import process 251 creates new categories and topics based on the mapping. The CSV files 250 may have rows of data delimited by a carriage return(s). The user may define a parsing rule for a parser of the importing process 251. For example, the user may define which indexes in a line would map to topic name, summary section, body section, etc. The import process 251 may creates new topics within the network servers 140. Since each of the new categories can have N number (one or more) of plug-ins associated with it, each topic inherits the plug-ins available to the category. Each of the topics can have one or more plug-ins like a Scorecard associated with the topic and provide additional functionality (ies) to each of the sections that came from the CSV file 250. The result is Category and Topic creation 252.

Figure 8:
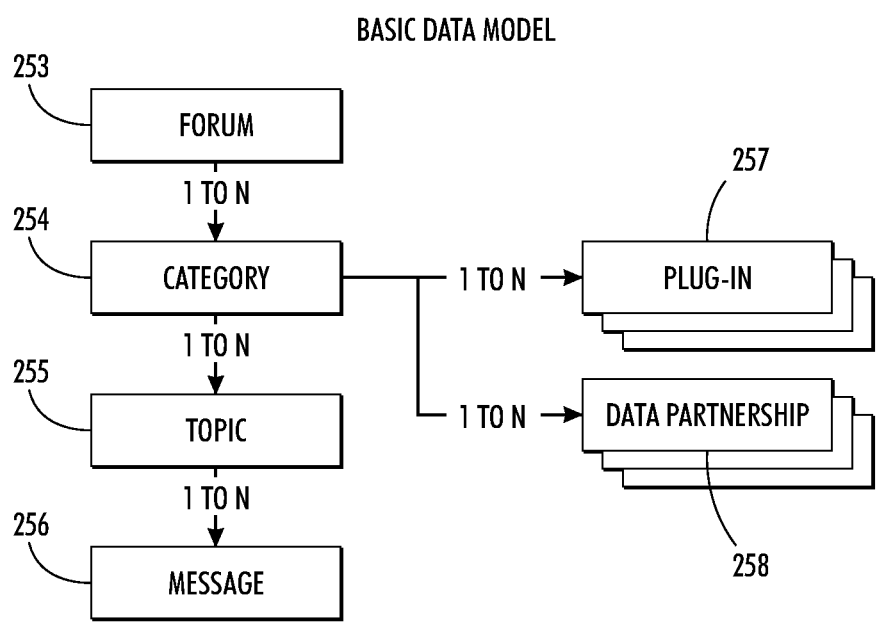
FIG. 8 shows the basic data model of the embodiment of the present invention.

The basic data model is shown in FIG. 8. The basic data model consists of an Active Forum 253 that can have 1 to N Categories 254, with 1 to N Topics 255 and 1 to N Messages 256. The Categories can also have 1 to N Plug-Ins 257 as well as 1 to N Data Partnerships 258.

Figure 3:
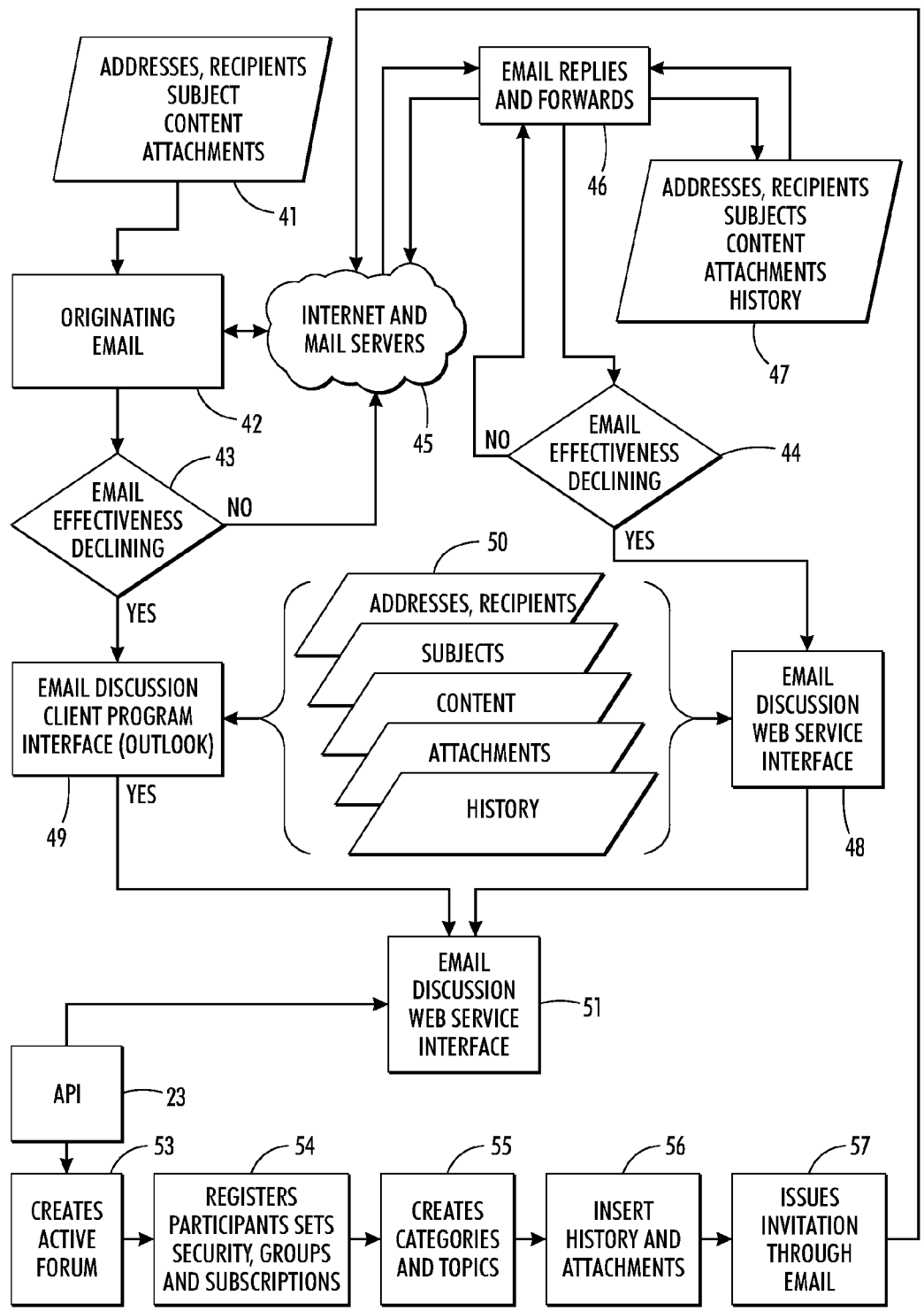
FIG. 3 shows a flow diagram of a process of changing states based on e-mail communications among the users, and transforming them into an active forum.

In FIG. 3, graphic elements 41, 42, 43, 44, 45, 46, and 47 portray a traditional email communication between multiple recipients. For example, E-mail 41 comprises e-mail addresses of recipients, subject of the e-mail, contents (or e-mail body text) and attachments. Originating e-mail 42 may be sent or received via Internet and Mail Servers 45. Or, various e-mail responses (being replied to the original or forwarded therefrom) 47 comprises the similar elements as original e-mail 41, including addresses of recipients, subjects, content, attachments and history of correspondences. Such E-mail replied and forwarded 46 travels through Internet and Mail Servers 45 as well. Such correspondences (original e-mails 42 or replied/forward e-mails 46) may be monitored via the network servers 140 for its effectiveness. Once the effectiveness has been declined or has determined to be declined at step 43 or 44, the network servers 140 may be used to take over the e-mail thread, published in an active forum to improve the communication effectiveness.

The network servers 140 of the embodiment of the present invention address the issue of providing a system that is able to provide a communications and interface change of state when the history and involvement of multiple email recipients results in a loss of productivity as defined as a decline in effectiveness 43, 44. The network servers 140 interface with an e-mail client(s), available as an add-on to an e-mail discussion client program interface such as add-on to Outlook 49 or as an e-mail discussion web service interface 48 that is available as an http address or as an email address. These interfaces 48 and 49 extract the component parts of the email thread 50 and present a preview of all of the content arranged by category and topic 51, which resembles to the process denoted as reference numeral 16 in FIG. 1. Upon acceptance of the preview the API 23 is called and invokes the systematic processes of creating an active forum 53, registering participants to the active forum by setting security, groups and subscriptions 54, creating categories and topics 55, inserting history and attachments 56 and issuing invitation to other uses associated with the groups, subscription, topic and/or categories 57 in accordance with the preview criteria. The embodiment of the present invention provides a collaborative discussion based interface as an alternative to email.

The network servers 140 of the present invention may further provide a user definable reporting system, which is based on taxonomy provides for metaphor based reporting. For instance the weather report for communities allows the user to define types of weather associated with the mood reflected in discussion. Each type of weather has a set of words or slang, symbols, punctuation, emoticons, and business rules. The system is flexible in terms of the number of metaphors. The system can also be historical, current or predictive in terms of displaying the metaphors—in this case the weather. A community discussion that has a lot of frustrated users for instance might display a weather metaphor of a storm. The words depicted might be very negative, the punctuation emphatic, the emoticons bitter, angry, and the business rules may show slow responses from the community to questions or problems etc. The overall result is that for this category there is a fairly negative mood and therefore the current weather is stormy depicted by a grey sky and storm cloud. The historical works on the same basis and the predictive is based on the trend (% change from one mood to another).

Figure 4:
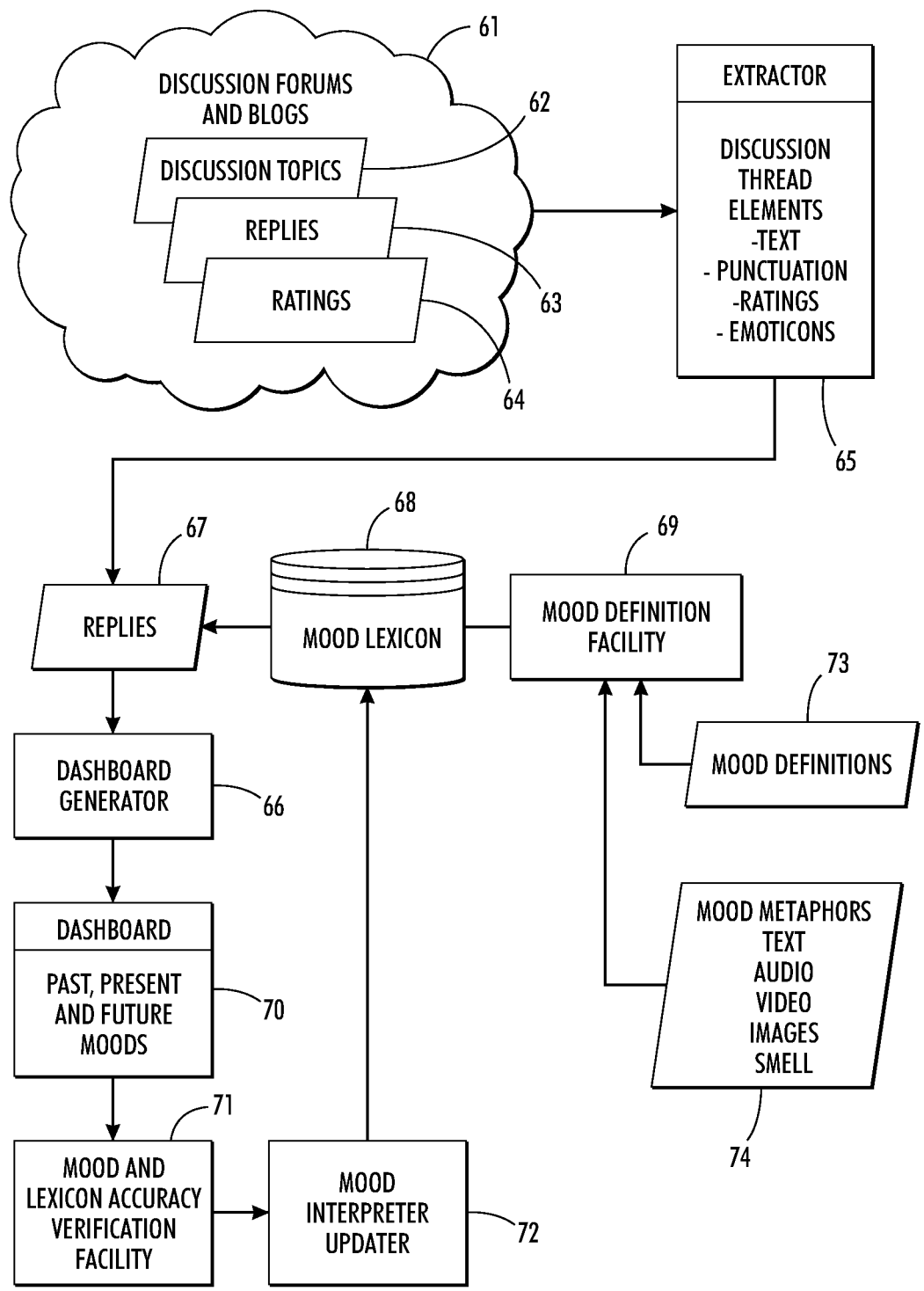
FIG. 4 shows a flow diagram of a process of detecting mood from data in an active forum.

For example, in FIG. 4, an extractor 65 of the network servers 140 parses and extracts data from active forums and blogs 61 by discussion topics 62, replies 63 and ratings 64. The extractor 65 looks at all of the elements in the active forums and blogs for text, punctuation, ratings and emoticons.

Separately, a mood definition facility creates a mood lexicon 68 which is contained in a server database. The mood lexicon 68 is created from mood metaphors 74 and mood definitions 73.

The dashboard generator 66 examines the extractor 65 output in the context of the mood lexicon 68 and generates a dashboard 70 showing past, present and future (forecasted) moods.

The user then provides accuracy feedback through the verification facility 71 by drilling down and or view accuracy reports 67 as output. The mood interpreter updater 72 takes accuracy feedback from the verification facility and updates the mood lexicon 68 accordingly.

The present invention addresses the problem that fixed data does not provide adequate feedback for community and collaborative sites where forums and blogs and freeform text, punctuation, symbols, ratings and emoticons capture the mood of the community. Users are communicating with short forms, acronyms, symbols and have created a lexicon that is not embodied in standard dictionaries. Lexicons can be community specific according to gender and subject matter. The present invention provides a computer-implemented method and system to capture the mood in the context of a mood lexicon. Examples might be a consumer forum where the mood that is mapped is metaphorically shown as the weather. Where a state of happy is projected as the sun and a state of dissatisfaction or frustration is depicted as thunder showers.

The foregoing is considered as illustrative only of the principles of the present invention. Further, since numerous modifications and changes will readily occur to those skilled in the pertinent art, it is not desired to limit the present invention to the exact construction and operation shown and described herein, and accordingly, all suitable modification and equivalents may be resorted to, falling within the scope of the present invention.

The invention claimed is:

1. A computer implemented system for collaboration of one or more documents comprising:
   a. at least one computer having a data storage device comprising at least one database stored in a memory;
   b. the computer implemented system implementing a parser that parses the one or more documents provided by an expert and splits each document into sections based on a parsing rule according to a hierarchy and scope of the each document;
   c. the computer implemented system implementing a category and plug-in control that examines each of the sections of the each document, generates and stores a framework for the each of the sections of the each document in the at least one database, and assigns one or more categories and one or more actionable plug-ins to the each of the sections of the each document based on the context of the each of the sections of the each document;
   d. the computer implemented system implementing a modeling module that generates and stores a model for the framework in the at least one database, and further generates one or more data partnering objects according to the model; and
   e. the computer implemented system implementing a publisher that generates an active forum by retrieving appropriate one or more models pursuant to a request from a user, according to one or more attributes of the user or any combination thereof, retrieving appropriate one or more data partnering objects and applying appropriate one or more frameworks, and publishes the active forum; and
   wherein the hierarchy and the scope of the each document comprises title, header, sections, chapters, outline levels, and topic end points including sentence or paragraph.

2. The computer-implemented system as recited in claim 1, wherein the one or more categories are assigned manually by a user.

3. The computer-implemented system as recited in claim 1, wherein the one or more categories are assigned automatically based on the context of the each section of each document.

4. The computer-implemented system as recited in claim 1, wherein the each document is in XML, plain text, Word, Excel, PowerPoint, CSV, PDF file or any combination thereof.

5. The computer-implemented system as recited in claim 1 further comprises an e-mail interface for converting one or more e-mail correspondences for the parser to generate the active forum.

6. A computer-implemented system for converting one or more static contents into an active forum for on-line collaboration, comprising:
   a. at least one computer having a data storage device comprising at least one database stored in a memory;
   b. the computer-implemented system implementing a parser that parses each of the one or more static contents, splits the each of the one or more static contents into sections based on a parsing rule according to a hierarchy and scope of the each of one or more static contents, assigns one or more categories to each of the sections, assigns one or more plug-ins to each of the sections, generates one or more data partnering objects based thereon, and stores the one or more data partnering objects in the at least one database; and
   c. the computer-implemented system implementing an interface that interfaces with a user and the at least one database to create or update one or more active forums by retrieving appropriate one or more data partnering objects from the at least one database pursuant to a request from the user, attributes of the user or any combination thereof, and publishes the updated one or more active forums; and
   wherein the hierarchy and the scope of the each document comprises title, header, sections, chapters, outline levels, and topic end points including sentence or paragraph.

7. The computer-implemented system as recited in claim 6, wherein the parser further generates a framework based on the each of the sections of the each of the one or more static contents, the one or more of categories assigned, and the one or more of plug-ins assigned, and the computer-implemented system further comprises the computer implemented system implementing a model capture module for capturing a model based on the framework for generating the one or more of the data partnering objects.

8. A non-transitory tangible computer readable storage medium having encoded thereon computer executable instructions causes a server to perform a method for converting one or more static contents into an active forum, the method comprising the steps of:
  a. parsing each of the one or more static contents and splitting the each of the one or more static contents into sections based on a parsing rule according to a hierarchy and scope of the each of the one or more static contents;
  b. generating a framework by extracting one or more categories for each of the sections and associating one or more plug-ins to the each of the sections, and storing the framework in at least one database in a data storage device;
  c. generating one or more data partnering objects based on the framework and store the one or more data partnering objects in the at least one database;
  d. pursuant to a request from a user and attribute of the user, retrieving appropriate one or more of data partnering objects and generating an active forum comprising the appropriate one or more of the data partnering objects; and
    wherein the hierarchy and the scope of the each document comprises title, header, sections, chapters, outline levels, and topic end points including sentence or paragraph.

9. The non-transitory tangible computer readable storage medium as recited in claim 8, wherein the one or more categories are assigned manually by a user.

10. The non-transitory tangible computer readable storage medium as recited in claim 8, wherein the one or more categories are assigned automatically based on the context of the each of the one or more static contents.

11. The non-transitory tangible computer readable storage medium as recited in claim 8, wherein the each of the one or more static contents is in XML, plain text, Word, Excel, PowerPoint, CSV, PDF file or any combination thereof.

12. The non-transitory tangible computer readable storage medium as recited in claim 8 further comprises an e-mail interface for converting one or more e-mail correspondences for the parser to generate the active forum.

13. A non-transitory tangible computer readable storage medium having at least one database comprising a data partnering object which when processed by a computer implemented server, causes the computer implemented server to build an active forum, the data partnering object comprising:
  a. sections of a document split by a parser implemented by the computer implemented server based on a parsing rule according to a hierarchy and scope of the document;
  b. one or more categories associated with and being assigned to the each section of the document;
  c. one or more plug-ins associated with and being assigned to the each section of the document;
wherein the data partnering object is retrieved from the at least one database by the computer implemented server pursuant to a request from a user, attributes of the user or any combination thereof and used by the computer implemented server to automatically build the active forum by executing the one or more plug-ins associated with the data partnering object; and
wherein the hierarchy and the scope of the each document comprises title, header, sections, chapters, outline levels, and topic end points including sentence or paragraph.

* * * * *